United States Patent [19]

Carr

[11] Patent Number: 5,246,243
[45] Date of Patent: Sep. 21, 1993

[54] TOWING VEHICLE MOUNTED RECEIVER HITCH ACTUATING A TOWED VEHICLE'S BRAKE SYSTEM

[75] Inventor: Larrey Carr, Lodi, Calif.
[73] Assignee: Burns Family Living Trust, a part interest
[21] Appl. No.: 820,202
[22] Filed: Jan. 13, 1992
[51] Int. Cl.5 .................................................. B62D 53/06
[52] U.S. Cl. .................................. 280/428; 188/112 R; 188/3 H
[58] Field of Search ............... 280/427, 428, 491.2, 280/491.3; 188/112 R, 3 H

[56] References Cited

U.S. PATENT DOCUMENTS

| | | | |
|---|---|---|---|
| 3,007,552 | 11/1961 | Eksergian | 188/112 R |
| 3,065,830 | 11/1962 | Krotz | 188/112 R |
| 3,072,223 | 1/1963 | Yoder | 188/112 R |
| 3,570,633 | 3/1971 | Garnett | 280/428 |
| 3,948,566 | 4/1976 | Salam | 188/112 R |
| 4,453,620 | 6/1984 | Angus et al. | 188/112 R |
| 4,889,212 | 12/1989 | Temple | 188/112 R |
| 5,013,059 | 5/1991 | Goettker | 188/112 R X |

FOREIGN PATENT DOCUMENTS

| | | | |
|---|---|---|---|
| 0679306 | 9/1952 | United Kingdom | 280/428 |
| 2186929 | 8/1987 | United Kingdom | 188/112 R |

*Primary Examiner*—Margaret A. Focarino
*Assistant Examiner*—Florian Zeender
*Attorney, Agent, or Firm*—Mark C. Jacobs

[57] ABSTRACT

A receiver hitch for a motor home or other towing vehicle, adapted to actuate the brake system of a vehicle being towed by the motor home. The apparatus comprises three portions the first of which moves forwardly, to actuate a master brake cylinder of the third portion, which master cylinder will then dispense fluid to the brake system of the vehicle being towed. The intermediate portion of the apparatus is used for mounting it to the motor home or other towing vehicle and for the reception of the first and third portions.

7 Claims, 4 Drawing Sheets

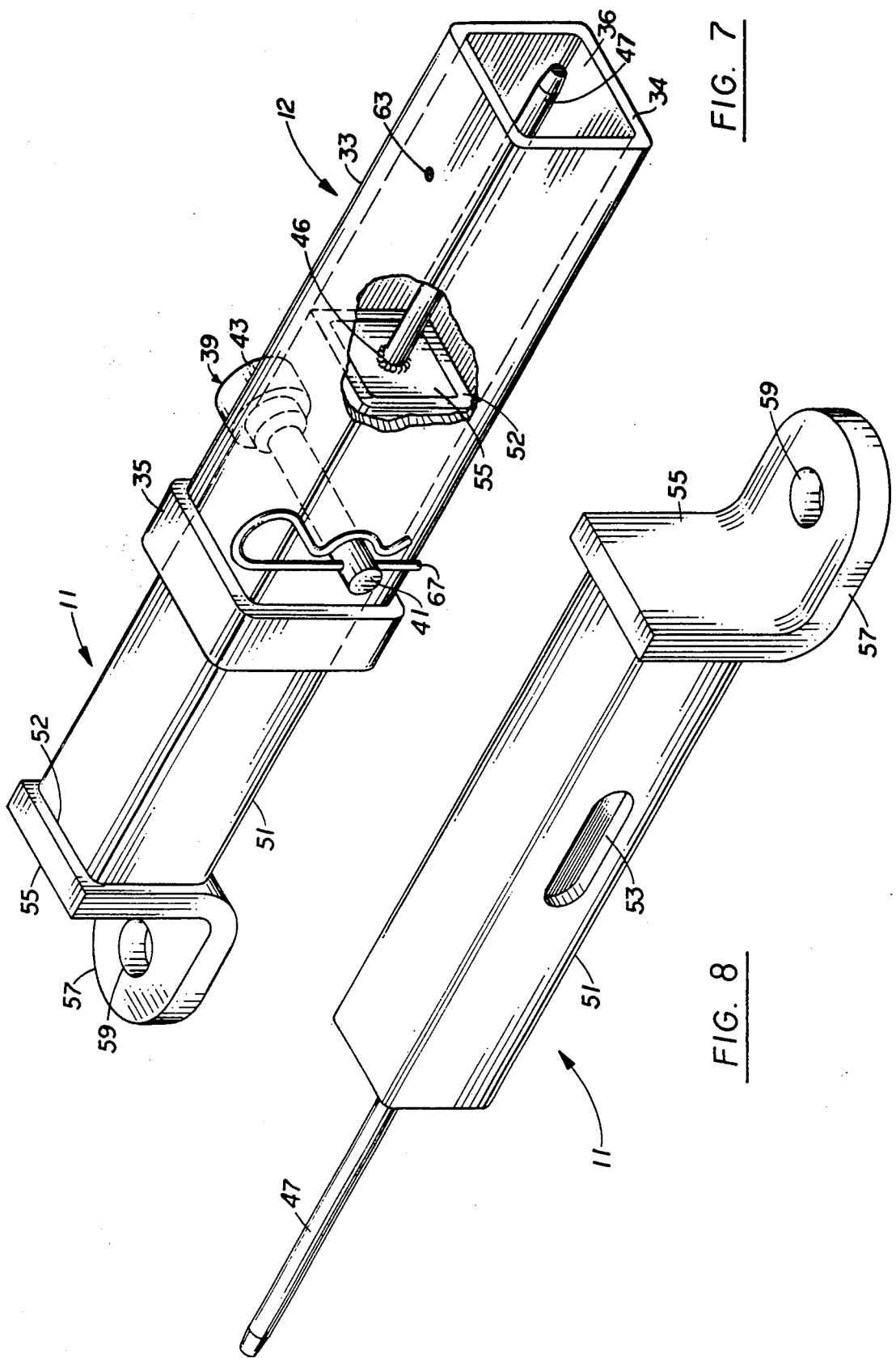

5,246,243

TOWING VEHICLE MOUNTED RECEIVER HITCH ACTUATING A TOWED VEHICLE'S BRAKE SYSTEM

FIELD OF THE INVENTION

This application relates to hitches used to connect a towed vehicle to a towing vehicle.

BACKGROUND OF THE INVENTION

Previously I have filed patents and been awarded allowable claims on subject matter pertaining to expensive towing apparatuses for use by motor homes for towing automobiles, motorcycles and minitrailers behind them. Sometimes, however, motor homes come pre-equipped with a receiver hitch and as such the owner of the motor home does not want to incur a double expense by purchasing towing apparatuses, for instance as disclosed in my U.S. Pat. No. 4,761,015 issued Aug. 2, 1988. In view of the presence of such receiver hitches, I have now devised an improved low-cost brake actuating hitch mechanism for use with towing vehicles that have a built-in receiving hitch. Such a mechanism is indeed preferred to a standard trailer hitch as may be mounted on a towing vehicle (motor home) because the apparatus of this invention will not only permit the remote actuation of the lights of the towed vehicle, but the braking system of the towed vehicle as well. The device of this invention combines the low cost of the receiver hitch with the added safety of a brake actuating system for the towed vehicle, all at minimal cost.

It is one object therefore of this invention to provide a new improved receiver hitch for disposition beneath a conventional motor home.

Another object is to provide a new receiver hitch which can be fashioned from the modification of an existing receiver hitch.

Still another object of the invention is to provide a towed vehicle's brake actuating system based upon a new receiver hitch.

Yet another object is to provide a low-cost brake actuating system for a towed vehicle.

These and other objects of the invention will in part be obvious and will in part appear hereinafter.

The invention accordingly comprises the product possessing the features, properties and the relation of components which are exemplified in the following detailed disclosure and the scope of the application of which will be indicated in the claims.

For a fuller understanding of the nature and objects of the invention, reference should be made to the following detailed description taken in conjunction with the accompanying drawings.

While no patent search has been conducted on the brake actuating receive hitch of this invention, applicant is aware of the following U.S. patents:

| 3,570,633 | Garnett |
|---|---|
| 3,751,072 | Williams |

Neither of these patents alone or in combination anticipates or renders obvious to claims of this invention.

BRIEF DESCRIPTION OF THE FIGURES

FIG. 7 is a rear isometric view of the combination of the first and second portions of the invention.

FIG. 8 is a front isometric view of the first portion of the apparatus of this invention.

SUMMARY OF THE INVENTION

A low-cost brake actuating receiver hitch mountable beneath a towing vehicle. The apparatus of this invention may be fashioned from a conventional receiver hitch which is modified to move laterally within a receiver whereby upon forward thrust of the hitch section a probe contacts the actuator for a master cylinder to thereby send brake fluid to the brake system of a towed vehicle.

DESCRIPTION OF THE PREFERRED EMBODIMENT

Figure 1:
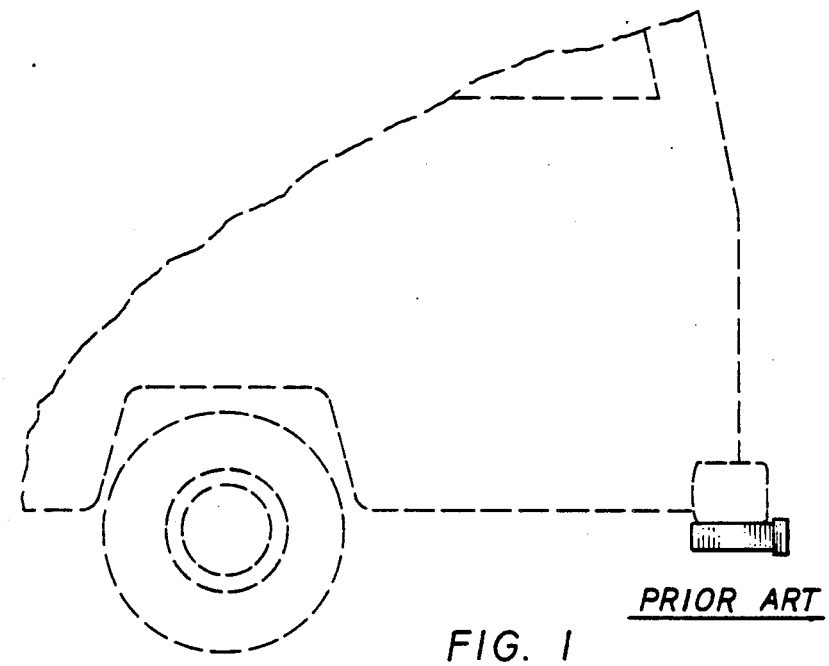
FIG. 1 is a close-up of the left rear side of a motor home showing a prior art receiver hitch mounted thereon.

The apparatus 10 of this invention is intended to be mounted on the undercarriage of a motor home or other towing vehicle and is used to tow a vehicle such as a trailer, which trailer is to be connected via a ball pin. In orientation the front of the apparatus would be viewed from the rear of the motor home. The left side of the apparatus would be seen from the left side of the motor home as in FIG. 1. The rear of the apparatus with the master cylinder thereon would be oriented toward the forward end of the motor home. However, the drawings show the apparatus along its length for ease of understanding.

Figure 2:
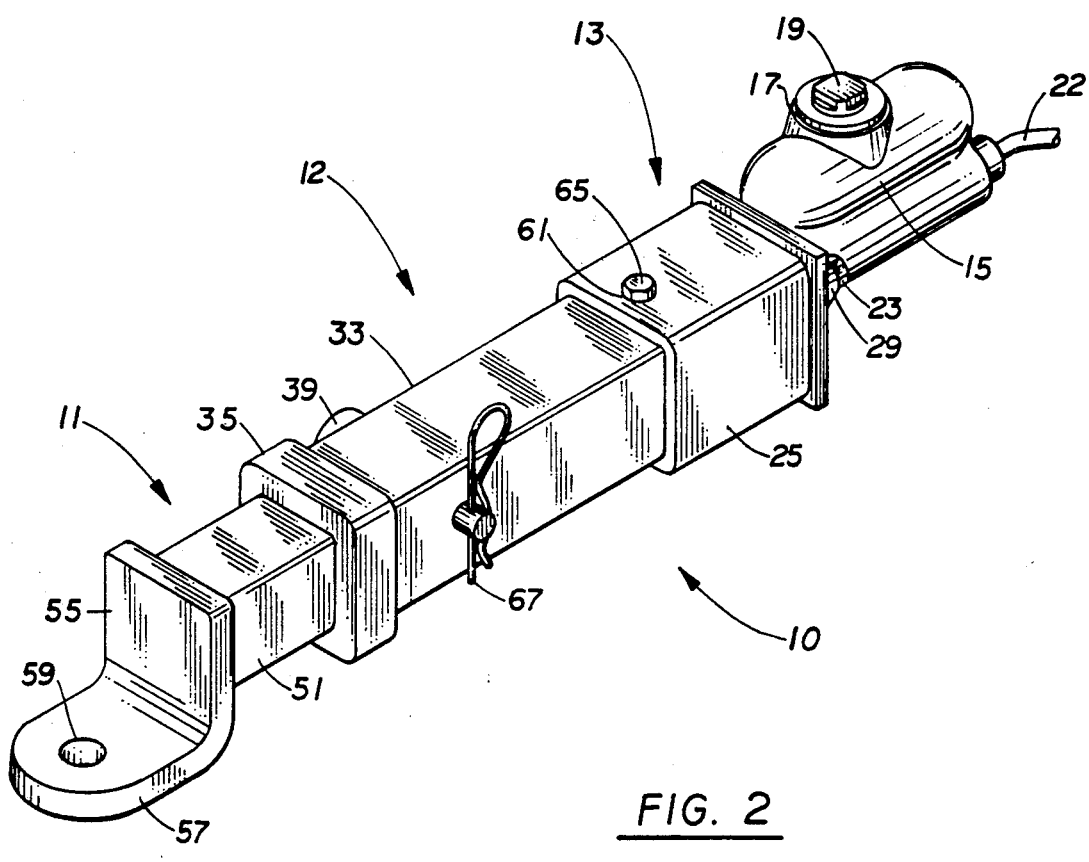
FIG. 2 is a top right isometric view of the apparatus of this invention.
Figure 6:
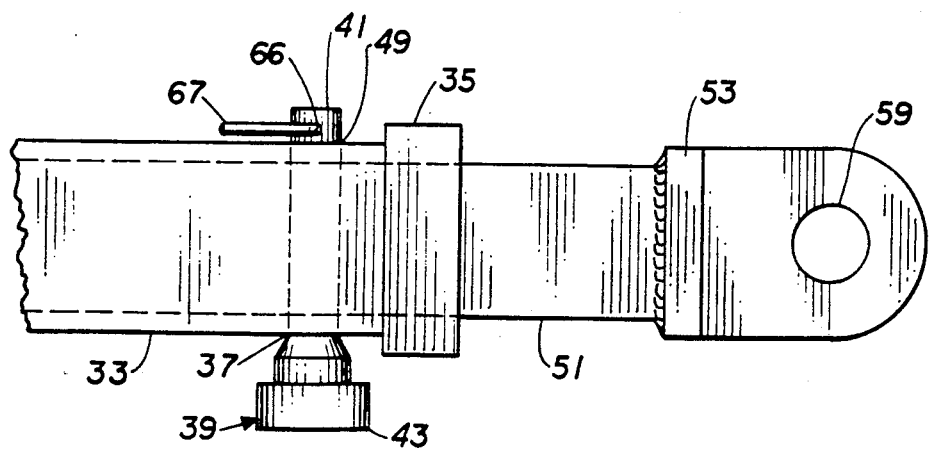
FIG. 6 is a top plan view of part of the first and second portions of this invention.

The apparatus 10 is divided into three portions, a first portion 11, a second portion 12 and a third portion 13 as seen in FIG. 2. It comprises an assemblage of these three portions; namely, the first portion comprising inner square tubing, the second portion comprising intermediate square tubing, and the third portion comprising a conventional vehicle master cylinder secured to outer square tubing. The discussion commences with the first portion as seen in FIGS. 2, 6, and 8.

The inner square tubing 51, which comprises the first portion of this invention, is sized slightly less in cross section than the intermediate square tubing comprising the second portion and it nests a suitable amount within the intermediate square tubing. Inner square tubing 51 includes a pair of side walls each of which has an aligned slot 53, one of which is seen in FIG. 8. The other on the opposite face of 51 is not visible. These elongated horizontal slots will align with pin openings 37 and 49 in intermediate square tubing 33 when the inner square tubing 51 is nested within the intermediate square tubing 33. Pin 39 has a shaft 41, which when inserted through the two openings 37 and 49 and the two slots 53 is retained in place by hitch pin 67 which fits into opening 66 in said pin shaft as seen in FIG. 6. This permits front or inner square tubing to move lateral, the length of the horizontal slots 53 within the intermediate square tubing along pin 39.

First portion 11 also includes a front panel 55, which has an interior surface and an exterior surface, which panel is vertically disposed and welded or otherwise secured over the front (proximal) end 52 (per FIG. 7) of the inner square tubing 51. The distal end 52' is closed by plate 55'. A central bore 46 in plate 55' permits rod 47 to extend therethrough.

Preferably formed integrally with the tubing, and directed normally away from front panel 55 at the lower edge of the exterior surface of said panel is tongue 57 which in turn has a vertical tongue hole 59 therein. A hitch such as a conventional ball hitch mounted on a vehicle to be towed is connectable via tongue hole 59 to apparatus 10 of this invention.

Probe 47, seen in FIGS. 7 and 8, is welded or otherwise secured normal to front plate 55 on its interior or inner side.

Figure 5:
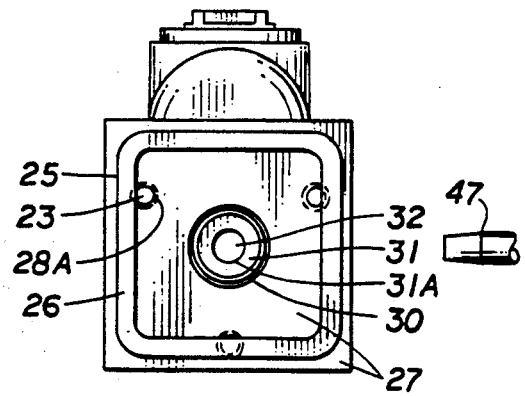
FIG. 5 is a front elevational view of the third portion of this invention.

Reference should now be made to FIG. 6. Here the intermediate square tubing 33 which comprises the second portion is seen. Tubing 33, which is open on its proximal end to receive the inner square tubing 51, also nests on its open distal end 34 into open end 26 of outer square tubing 25, as seen in FIG. 5 to abut flange plate 27. Intermediate tubing 33 is shown secured to inner square tubing 51 on what would be termed the intermediate tubing's proximal end and the inner tubing's distal end in FIG. 6 via a pin 39. In the intermediate tubing are a pair of aligned openings 37 and 49. Pin 39 seen in FIG. 6 with its shaft 41 and pin head 43 is inserted through these aligned openings and through inner square tubing 51's elongated slots 53 to permit the inner square tubing to slide slightly relative to the intermediate square tubing and to secure the inner square tubing to the intermediate square tubing 33. The pin 39 is secured in place using hitch pin 67.

Intermediate tubing 33 may be secured to outer square tubing 25 via threaded bolts 65, seen in FIG. 2 which are threaded into the aligned bolt openings 61 (FIG. 4) of the outer tubing 25 and then into threaded openings 63 in the intermediate tubing seen best in FIG. 7. Tubing 33 may also be welded to tubing 25.

Intermediate tubing 33 may have a collar 35 welded or otherwise secured at its proximal end for reinforcement. The distal end of 33 is an unobstructed opening 36.

Figure 3:
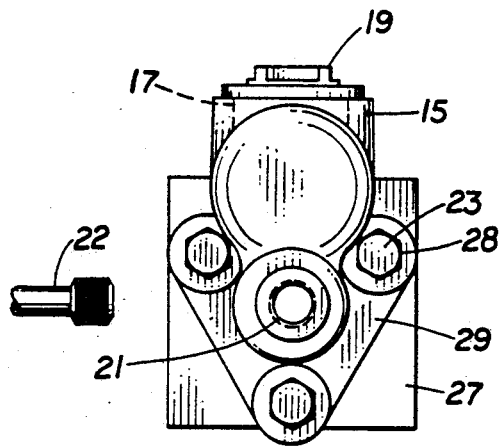
FIG. 3 is a rear elevational view of the apparatus of this invention.
Figure 4:
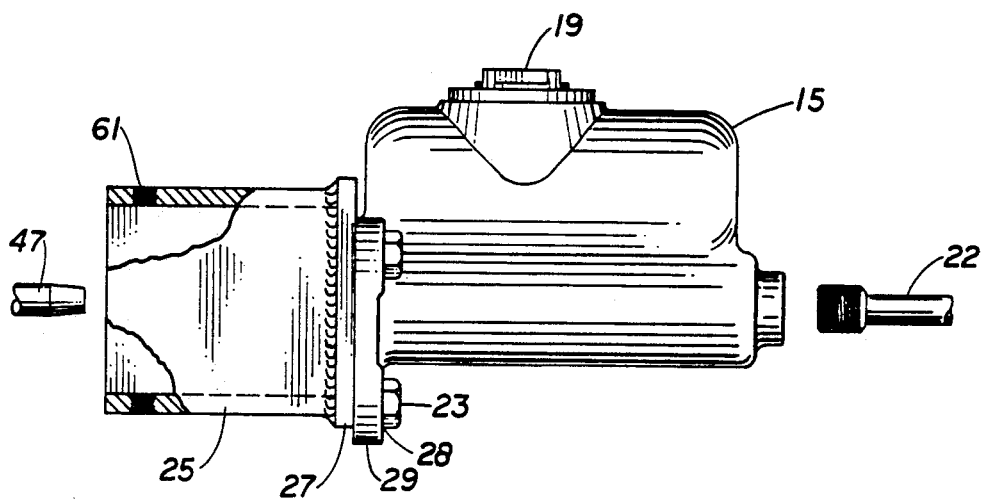
FIG. 4 is a left side elevational view of the third portion of this invention.
Figure 10:
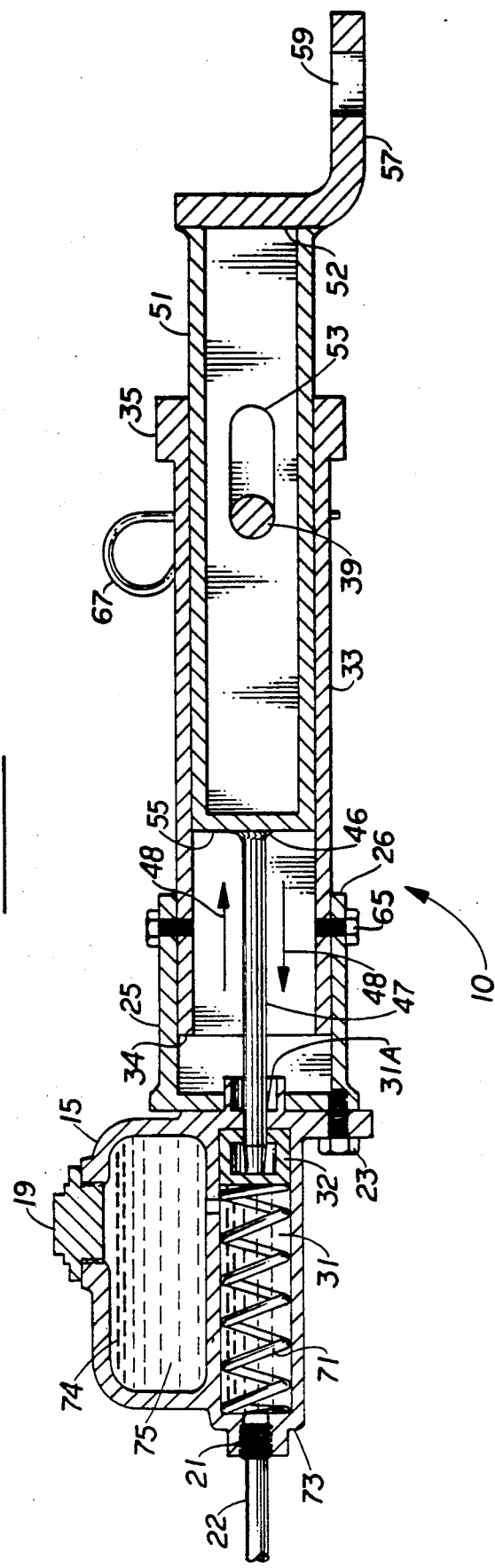
FIG. 10 is a sectional view, illustrating the operation of this invention.

The third portion 13 seen best in FIGS. 3 and 4 comprises a conventional master cylinder housing 15, having a threaded opening 17 for the receipt of brake fluid. This opening 17 is closed off by a threaded cap 19. At the rear of the cylinder housing 15 is a threaded opening 21 adapted to receive a brake fluid line 22, shown disconnected from opening 21. Line 22 communicates on its other end with the brake system of a towed vehicle. Such connections are deemed conventional. A piston, not seen here but discussed later, when actuated (as will be discussed), can move brake fluid from the master cylinder housing 15 through line 22 to the towed vehicle's braking system. See FIG. 3. Reference is also made to FIG. 10 which shows the piston 32 which is not seen in FIGS. 2, 3 or 4.

On one end of the master cylinder housing 15 there is an integrally attached mount plate 29. This cylinder mount plate 29 has openings 28, which align with threaded openings 28A in flange plate 27. Bolts 23 connect the mount plate 29 to the flange plate 27 which closes off the outer square tubing 25's distal end.

While the master cylinder housing is indeed conventional and can be purchased off the shelf a moment shall be devoted to a brief discussion of its construction. The master brake cylinder housing comprises a cylinder 31 having a cylinder opening 31A, a piston 32 disposed in said cylinder, an accessible and fillable brake fluid storage chamber 75 in fluid communication with said cylinder, and a mount plate 29 to be secured to the flange plate 27 of the outer square tubing, through which mount plate access may be had to the cylinder opening. The securing of plates 27 and 29 may be permanent as by welding or removable as by the use of bolts. The cylinder housing further includes a port 21 in fluid communication with the cylinder through which brake fluid can be delivered to a braking system through a brake line 22. See FIG. 10.

The reader's attention is now directed to FIG. 5. Here one may observe the interior of outer square tubing 25. Also the interior face of flange plate 27 which closes off the distal end of the tubing may be seen. Flange plate 27 has a central opening 30 for receiving the master cylinder housing's cylinder 31 opening 32. Also seen are all three of the mounting bolts 23 used for mounting of the master cylinder housing. The forward top of the piston or probe 47 is shown in this figure since it fits into the opening 32 of cylinder 31, it being understood that probe 47 is seen in a disassembled position.

This completes the discussion concerning the structure of this invention.

To give the reader a better understanding of the relative size of the elements involved in this invention, it is seen that the brake fluid chamber is about 4.5" long by 2.25" in diameter. The outer square tubing 25, may be about 3"×3"×3" and the mount plate 29 that attaches to it extends over about ¼".

The length of the elongated slot can vary from about 2" to 3" or more. The length of the probe 47 will affect this dimension. There is of course no criticality to most of the dimensions. One of the few that must be standardized is the tongue hole 59. It must be sized to engage conventional equipment. Such dimensions are known to the art.

In so far as fabrication is concerned, with reference being made to FIG. 2, it is seen that oftentimes portion 12 of invention 10 is pre-mounted as by brackets or welding on to the rear of a motor home. See FIG. 1. A portion somewhat related to portion but lacking several components may be in engagement to portion 12 If present, the 11-like portion is removed, and if possible modified to simulate portion 11 in appearance If not possible a new portion 11 must be employed. The modifications include the insertion of slot 53 to permit reciprocation on pin 39, and the insertion and mounting of the probe 47, such that the master cylinder can be actuated.

Figure 9:
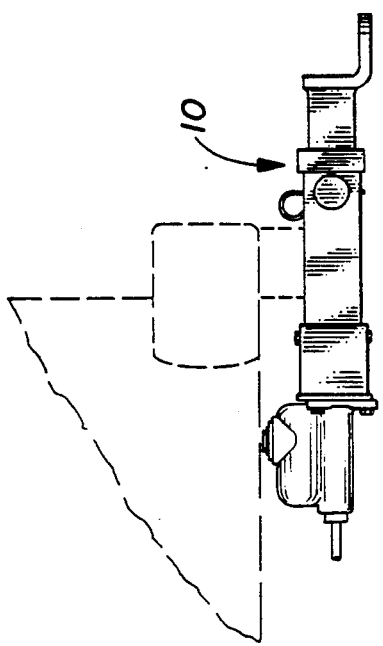
FIG. 9 is a left side elevational of a part of a motor home showing the apparatus of this invention mounted therebeneath.

Third portion 13 is fabricated utilizing a conventional master cylinder and an outer square tubing. The third portion is mounted to what may be a preexisting portion 12, which second portion may be attached beneath the motor home. (Of course assembly of new parts is preferred to the retrofitting of an old intermediate portion with new first and third portions.) See FIG. 9. Fluid line 22 from the cylinder per FIG. 9 and FIG. 3 is connected in conventional fashion to the braking system of the vehicle to be towed. In the alternative this line 22 can be connected to the actuator device disclosed and claimed in my co-pending application Ser. No. 07/495,086 filed Mar. 19, 1990.

The third portion of this invention can be secured to the second portion after nesting of one to the other as by welding of the top surface of the intermediate tubing to the leading edge of the outer tubing, or by pinning one to the other for a removable connection as previously discussed.

OPERATION

In operation, when the motor home's brakes are applied, the hitch connected to the towed vehicle will continue to move forward by inertia. The first portion 11 of this invention connected to the hitch will also move forward the length of the slot 53 therein, thereby causing the probe to move the piston within the cylinder of the master cylinder housing to cause brake fluid to flow through line 22 to the brake system of the towed vehicle to bring it to a halt. When the brake is released, fluid returns to the master cylinder in conventional fashion.

More detail on the operation of the apparatus may be gleaned from the diagrammatic view, FIG. 10. Here the piston rod or probe 47 which is seen to be mounted by either a holder or mere welding material 46 is positioned normal to the interior surface of the front panel 55 to which it is attached on one end. The other end of the probe is disposed within the cylinder 32 as is discussed elsewhere herein. This engagement may be by friction fit or by other conventional means such as by bolting or adhesive if desired.

Piston 32 slides back and forth per arrows 48 within the cylinder 31. The cylinder contains standard brake fluid as is indicated by lining 74. A coil spring 71 is welded or otherwise secured to the interior surface of the rear wall of the cylinder 73 to urge the piston 32 back to its "at rest", i.e. no braking action, location. When the towing vehicle enters a braking situation, such that piston 32 moves within the cylinder 31, brake fluid 74 is forced through the hose connection 21 to brake line 22 to the brakes of the towed vehicle. Such fluid flow is deemed to be conventional operation of a brake cylinder.

It is seen that I have provided a new low cost receiver hitch brake actuating system for towed vehicles being transported behind motor homes. It can be fashioned as a new apparatus or where necessary it can be formed by the modification of a conventional receiver hitch.

Since certain changes may be made in the above product without departing from the scope of the invention herein involved, it is intended that all matter contained in the above description and shown in the accompanying drawings shall be interpreted as illustrative and not in a limiting sense.

I claim:

1. An apparatus mounted on a towing vehicle for actuating the brakes of a towed vehicle having its own operable braking system, which apparatus comprises:
   an assemblage of three portions; namely, a first portion comprising inner square tubing, a second portion comprising intermediate square tubing and the third portion comprising a conventional vehicle master cylinder housing secured to outer square tubing;
   said first portion's inner square tubing having a pair of spaced side walls each of which has an aligned slot, said inner square tubing being sized to be nestable within the second portion,
   said inner square tubing being closed off on its proximal end by a front panel, which front panel has an interior surface and an exterior surface; the exterior surface of which has an outward extending tongue normally disposed thereto, and said panel having a probe normally disposed on its interior surface;
   said second portion's intermediate square tubing being open at each end, and receiving the inner tubing therein at its proximal end, said inner tubing being slidingly secured thereto, said intermediate square tubing also being secured to the third portion's outer tubing;
   said third portion's outer square tubing being open at its proximal end, and closed off at its distal end by a flange plate having a central opening therein for receipt of a master cylinder housing's cylinder opening,
   said master brake cylinder housing comprising a cylinder having a cylinder opening, a piston disposed in said cylinder, an accessible and fillable brake fluid storage chamber in fluid communication with said cylinder, and a mount plate secured to the flange plate of the outer square tubing, through which mount plate access may be had to the cylinder opening, and further including a port in fluid communication with the cylinder through which brake fluid can be delivered to a braking system;
   said probe being engaged at its distal end in said piston, whereby upon the application of the brakes of a towing vehicle upon which the apparatus is mounted, said first portion will move slidingly within said intermediate portion while simultaneously causing the probe engaged in said piston to move in said cylinder to pump brake fluid through said port to the braking system connected to said port of a vehicle being towed and when the brake of the towing vehicle is released, such that the towing vehicle resumes movement, said first portion will move slidingly in the opposite direction within said intermediate portion, the probe will move away from the piston thereby releasing the braking system of the towed vehicle while causing brake fluid to return to said cylinder for the next braking situation.

2. In the apparatus of claim 1 wherein the intermediate square tubing is engaged to the outer square tubing by a pin.

3. In the apparatus of claim 1 wherein the intermediate square tubing is welded to the outer square tubing.

4. In the apparatus of claim I wherein the mount plate is secured to the flange plate by bolts.

5. In the apparatus of claim 1 wherein the intermediate square tubing has a reinforcing collar at its proximal end.

6. In the apparatus of claim 1 wherein the tongue is normally disposed along the lower edge of the front plate of the first portion.

7. In the apparatus of claim 1 wherein the mount plate is secured to the flange plate by bolts and the intermediate square tubing has a reinforcing collar at its proximal end.

* * * * *